United States Patent [19]

Gaspard

[11] Patent Number: 5,665,263
[45] Date of Patent: Sep. 9, 1997

[54] TEMPERATURE-PROTECTED INDUCTOR-BASED COOKING HEATER

[75] Inventor: Jean-Yves Gaspard, Saran, France

[73] Assignee: C E P E M, St Jean De La Ruelle, France

[21] Appl. No.: 559,045

[22] Filed: Nov. 15, 1995

[30] Foreign Application Priority Data

Nov. 15, 1994 [FR] France .................. 94 13652

[51] Int. Cl.$^6$ .................. H05B 6/06; H05B 6/12
[52] U.S. Cl. .................. 219/625; 219/626; 219/622; 219/665
[58] Field of Search .................. 219/622, 624, 219/625, 626, 627, 663, 665, 671, 667, 676

[56] References Cited

U.S. PATENT DOCUMENTS

| | | | |
|---|---|---|---|
| 3,996,442 | 12/1976 | Moreland, II et al. | 219/624 |
| 4,013,859 | 3/1977 | Peters, Jr. | 219/665 |
| 4,029,926 | 6/1977 | Austin | 219/624 |
| 4,055,740 | 10/1977 | Nakamura et al. | 219/663 |
| 4,317,016 | 2/1982 | Ito | 219/663 |
| 4,348,571 | 9/1982 | Dills et al. | 219/622 |
| 4,467,162 | 8/1984 | Kondo et al. | 219/624 |
| 4,506,131 | 3/1985 | Boehm et al. | 219/665 |

FOREIGN PATENT DOCUMENTS

| | | |
|---|---|---|
| 0 209 215 | 1/1987 | European Pat. Off. . |
| 2 201 391 | 8/1988 | United Kingdom . |

OTHER PUBLICATIONS

Patent Abstracts of Japan, vol. 018 No. 063 (E–1500), Feb. 2, 1994 & JP–A–05 283154 (Fuji MC:KK) Oct. 29, 1993—abridged.

*Primary Examiner*—Philip H. Leung
*Attorney, Agent, or Firm*—Oblon, Spivak, McClelland, Maier & Neustadt, P.C.

[57] ABSTRACT

An induction cooking heater includes at least one inductor, a high-frequency current generator and a magnetic circuit located beneath the inductor. The reluctance of the magnetic circuit is calibrated so that the magnetic circuit gets saturated from a predetermined temperature lower than the maximum permissible temperature for the inductor. A plate made of non-magnetic, electrically conductive material located beneath the magnetic circuit, gives rise to an increase in current in the inductor when the magnetic circuit starts getting saturated. The generator is then controlled by a regulator for limiting the value of the current in the inductor to deliver lower power to the inductor.

15 Claims, 2 Drawing Sheets

TEMPERATURE-PROTECTED INDUCTOR-BASED COOKING HEATER

BACKGROUND OF THE INVENTION

Field of the Invention

An object of the present invention is an induction cooking heater whose inductor is temperature-protected.

In induction cooking ranges, each cooking heater generally has an inductor positioned beneath the glazed ceramic plate on which the containers are placed. The inductor is supplied by a generator delivering high-frequency current. The inductor is conventionally formed by one or more coils of conductor wires, made of copper for example, that get heated during operation.

Present-days coils, which are made of wires that are stranded for high-frequency applications, can withstand heating temperatures below a critical temperature, typically in the range of 200° C., beyond which they undergo damage at the insulation between the wires. There is a known way, in the coil, especially at the center of the coil, of providing for a temperature sensor, for example a thermistor, to prevent the overshooting of temperature limits. However, this type of localized sensor has very localized action and does not take account of the entire surface area of the inductor. Furthermore, if the sensor does not work properly, there are situations in which the critical temperature may be reached and even exceeded. This is especially so when an empty container is placed above an inductor supplied with current, or when the food to be cooked has to be deep-fried.

It is therefore important to provide for a system that enables the stopping of the generator or a reduction of the power delivered by this generator when the heating of an inductor is close to its critical temperature.

Furthermore, presently known induction cooking heaters generally have a magnetic circuit located beneath the inductor, the role of which is to concentrate the magnetic field generated by the inductor towards the containers to be heated so as to optimize the heating and reduce conduction disturbances to the minimum.

There are know ways of using this magnetic circuit to protect the inductor in temperature.

The document FR 2 620 894 describes, inter alia, a system for the protection in temperature of an inductor using a magnetic circuit formed by ferrite cores positioned radially on the lower side of the inductor, wherein the ferrite cores are chosen so that their Curie temperature or Curie point is slightly below the critical temperature. Thus, when the temperature of the ferrites reaches the Curie point, the ferrites suddenly lose their magnetic property and the power delivered to the cooking utensil drops swiftly thus preventing the overheating of the inductor.

A system of this kind has the following drawbacks:

The Curie point of the ferrite power materials (for example, manganese-zinc) is greater than 200° C. This is already beyond the critical temperature for the inductors formed by stranded wires used in high frequency applications.

Furthermore, the fact of passing through the Curie point causes the system to stop suddenly and may furthermore result in a high level of hysteresis. Consequently, it may be necessary wait for a fairly lengthy period for the system to start working again even if the temperature of the inductor has fallen back to a permissible temperature.

The present invention is aimed at overcoming the above-mentioned drawbacks.

SUMMARY OF THE INVENTION

More specifically, an object of the invention is an induction cooking heater of the type comprising at least one inductor, a generator delivering a high-frequency current to supply the inductor and a magnetic circuit located beneath the inductor, wherein the magnetic circuit has a reluctance calibrated so that it gets saturated from a predetermined temperature lower than the maximum permissible temperature for the inductor, and wherein it further comprises:

- means giving rise to an increase in the drawing of current in the inductor beyond a boundary value as soon as the magnetic circuit gets saturated;
- regulation means detecting the increase in the drawing of current in the inductor beyond the boundary value, and then limiting the power delivered to the inductor.

BRIEF DESCRIPTION OF THE DRAWINGS

The working of an induction cooking heater such as this, designed to protect the inductor in temperature, shall be understood more clearly, along with other features of the invention, from the following description made with reference to the appended figures showing a preferred but not restrictive embodiment of the cooking heater according to the invention. Of these figures.

MORE DETAILED DESCRIPTION

Figure 1:
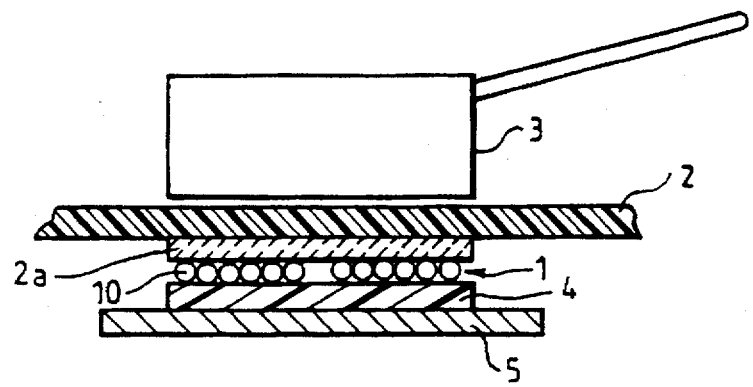
FIG. 1 shows a sectional view of the mechanical elements of an inductor cooking heater according to the invention.

FIG. 1 shows a schematic sectional view of the mechanical elements of an induction cooking heater according to the invention.

A cooking heater such as this conventionally has an inductor 1, formed for example by strands 10 of copper wires wound in a concentric way in the form of a spiral. The inductor 1 is placed beneath a cooking surface 2, for example made of glazed ceramic, on which the container 3 to be heated is placed. The inductor 1 is preferably separated from the cooking surface 2 by means of a layer 2a made of a thermally insulating material. The inductor 1 is supplied by a generator (not shown) delivering a high-frequency current, a possible operation of which shall be described in detail with reference to FIG. 2. The cooking heater also has a magnetic circuit 4 placed beneath the inductor 1, the main role of which is to focus the magnetic field lines generated by the inductor 1 towards the container 3.

The present invention is based on a particular characteristic of magnetic circuits, i.e. the fact that they have a value of induction at saturation $B_s$ that gradually diminishes when the temperature increases well before the Curie point is reached.

The invention consists in calibrating the reluctance of the magnetic circuit so as to obtain the following two effects:

in normal operation, at a temperature lower than a critical temperature determined as a function of the properties of the insulator of the coil of the inductor, the role of the focusing of the magnetic field by the magnetic circuit is optimal, i.e. there is no saturation;

in critical operation, namely for a predetermined temperature of the magnetic circuit lower than the critical temperature of the inductor, the magnetic circuit gets saturated.

Furthermore, the cooking heater according to the invention has means 5 that cause an increase in the current drawn into the inductor 1 when the magnetic circuit is in saturation. These means are advantageously formed by a plate 5 made of non-magnetic, electrically conductive material such as aluminium positioned under the magnetic circuit 4. When the induction at saturation $B_s$ of the magnetic circuit is reached, the presence of this aluminium plate has the effect of causing a drop in the impedance of the load supplied by the generator. This results in an increase in the current in the inductor. Regulation means that limit the value of the current in the inductor then come into play, according to the invention, to act against this increase in current and consequently protect the inductor in temperature by controlling the generator so that it delivers lower power into the inductor.

Figure 2:
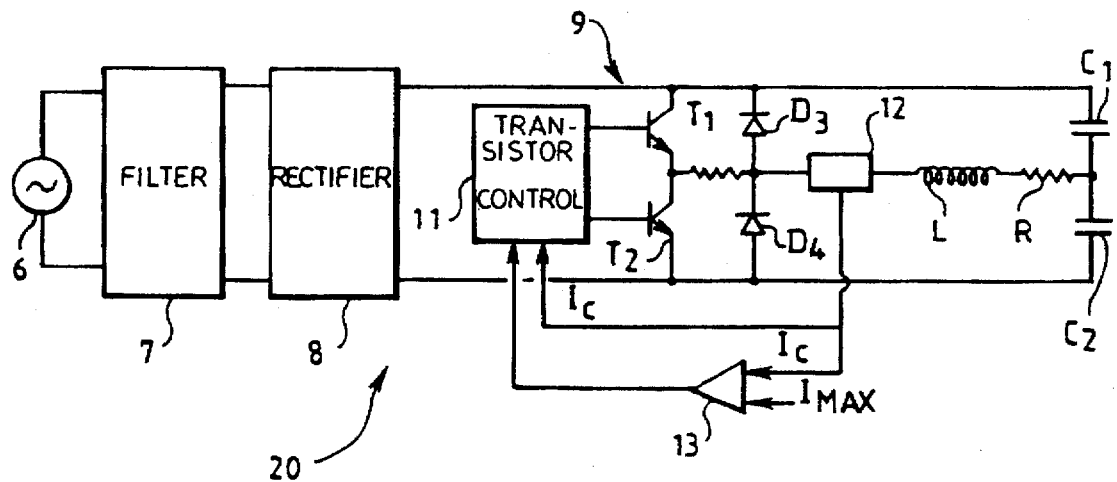
FIG. 2 provides an illustration, by way of a simplified example of constituent elements of a generator, for an inductor cooking heater according to the invention.

These regulation means may be an integral part of the electronic circuitry of the generator as shall be seen with reference to FIG. 2 which provides a simplified illustration of a possible generator structure to supply the above-mentioned inductor cooking heater.

The supply mains 6 deliver a low-frequency AC signal, for example at 50 Hz, filtered in a high-frequency filter 7 and rectified by rectifier means 8. The rectified voltage thus obtained is applied to a resonance inverter 9 whose general operation is recalled here below.

The inverter has mainly two bipolar transistors $T_1$, $T_2$ on which, as shown in the figure, two freewheeling diodes $D_3$ and $D_4$ and two capacitors $C_1$ and $C_2$ are parallel-connected. The load supplied by the inverter, formed by the inductor 1 and possibly by the container 3 placed on the inductor, is symbolized by the serial association of an inductor L and a resistor R.

Control means 11, not shown in detail, control the transistors $T_1$ and $T_2$ so that they are alternately conductive. When the transistor $T_1$ is conductive, the capacitor $C_2$ is charged by the inductor (L, R) at a frequency which is a function of the value of L and of $C_2$. If $I_C$ represents the effective intensity of the current present in the load, the dissipated power is equal to $RI_C^2$. When the current $I_C$, whose value is measured by means 12, for example a current transformer, gets cancelled, the control means 11 activate the conduction of the transistor $T_2$ and the capacitor $C_1$ is in turn charged through the inductor L, R.

Consequently, an almost sinusoidal current is obtained in the load L, R. The frequency of this current is linked to the value of L and the power is linked to the value of R.

The various components of this generator are calibrated so as to work for a given nominal power of the generator, for example 2.8 kW, with a load corresponding to a large-sized container, characterized by a value of R, for example 3 ohms, and a value of L, for example 50 micro-Henrys, at 25 KHz.

As we have seen further above, when the magnetic circuit 4 gets saturated, the value of the impedance (L, R) decreases owing to the presence of the plate 5. The current in the load increases accordingly and brings a limitation circuit into play. Through a comparison of the value of the instantaneous current in the load with a limit peak value $I_{max}$ reached during the saturation of the magnetic circuit, the comparison being done for example by a comparator 13, this limitation circuit then enables the reduction of the power given by the inverter. The limitation circuit achieves this reduction by turning off the conductive transistor in this inverter whenever the value of the instantaneous current in the load tends to go beyond the limit peak value $I_{max}$. This has the effect of causing a drop in the temperature of the inductor. Since the temperature of the magnetic circuit diminishes at the same time, the operation soon becomes normal again and off saturation.

It may be noted that the aluminium plate 5 also acts as a shielding against disturbances radiated or conducted by the inductor. To prevent a plate of this kind from itself generating disturbances, it is advantageously connected to the mains 6 by the filter 7 of the generator, preferably by means of a capacitor.

Figure 3:
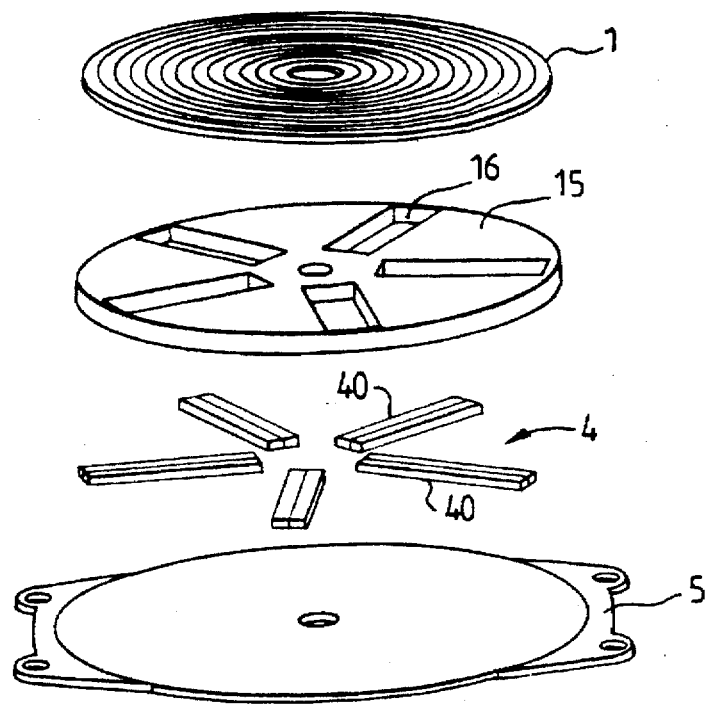
FIG. 3 shows an exploded view of different components of an inductor cooking heater in a preferred variant of the invention.
Figure 4:
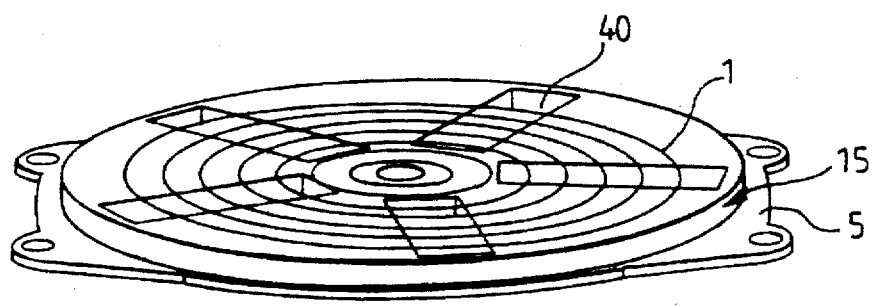
FIG. 4 provides an illustration, in an assembled form, of the components of FIG. 3.

FIGS. 3 and 4 show the constituent elements of an induction cooking heater in a preferred embodiment according to the invention without any generator, respectively in an exploded view and in an assembled view.

In these figures, the elements common with the other figures bear the same references. In this particular case, the inductor cooking heater has a support 15 comprising slots 16 arranged for example radially. The slots are designed to receive and hold the magnetic circuit 4 which takes the form of a plurality of ferrite bars 40. The calibration of the reluctance of the magnetic circuit is done in this specific case by optimizing the total volume of ferrite used. The choice of ferrites also enables the calibration of the reluctance.

Advantageously, the support 15 is made of a thermally conductive material so that the heat accumulating in the conductor can be discharged towards the aluminium plate 5. The support may, in particular, be a plastic material charged with a thermally conductive material (for example a vinyl ester charged with graphite or metal oxide such as alumina, or a refractory cement based on magnesium powder).

Figure 5:
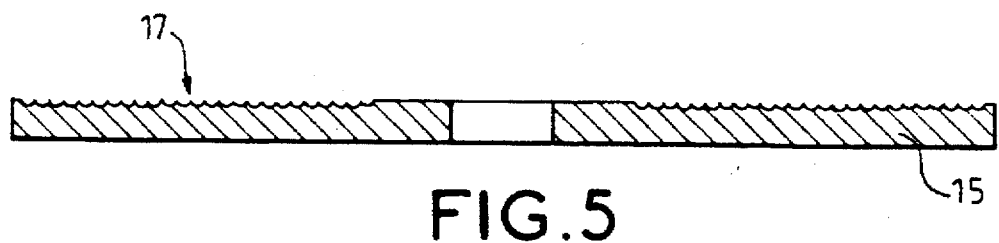
FIG. 5 shows a sectional view of an exemplary support for the inductor.

To improve the thermal coupling between the inductor 1 and the support 15 made of thermally conductive material, it is possible to envisage laying the inductor no longer simply on the surface of the support but in a spiral that is directly printed on the surface of this support. FIG. 5 shows a sectional view of a support 15 such as this on the surface of which a spiral 17 has been printed.

Finally, in another possible variant of a cooking heater according to the invention, the support, in addition to its function of supporting the inductor, is given the function of a magnetic circuit. To this end, the assembly formed by the support 15 and the ferrite rods 40 is replaced by a solid support, for example in the shape of a disk, the material of which is an iron powder or ferrite powder bound for example by a plastic. Should the material chosen be also a good thermal conductor (such as ferrite powder), it is also possible to print a spiral directly on top of this support in order to receive the inductor and improve the heat transfer. In this other variant, the reluctance is calibrated by the choice of the magnetic material and by the optimizing of the total volume. It is possible in particular, if it is desired to increase the reluctance for a given support, to make holes in this support.

An induction cooking heater according to the invention, in its various embodiments described here above, has the particular advantage, as compared with the prior art, of enabling a regulation of the temperature of the inductor and no longer a sudden stopping of the system. For, when the magnetic circuit gets saturated, the increase in current in the inductor is gradual. Furthermore, the state of saturation of the magnetic circuit shows no hysteresis. Thus, as soon as the temperature of the magnetic circuit returns to below the saturation threshold, the cooking heater returns to normal operation.

What is claimed is:

1. An induction cooking heater of the type comprising at least one inductor, a generator delivering a high-frequency current to supply the inductor and a magnetic circuit located beneath the inductor, wherein the magnetic circuit has a reluctance calibrated so that it gets saturated from a predetermined temperature lower than the maximum permissible temperature for the inductor, and wherein it further comprises:

means giving rise to an increase in the drawing of current in the inductor beyond a boundary value as soon as the magnetic circuit gets saturated;

regulation means detecting the increase in the drawing of current in the inductor beyond the boundary value and then limiting the power delivered to the inductor.

2. An induction cooking heater according to claim 1, wherein the means generating an increase in current are constituted by a plate made of non-magnetic, electrically conductive material positioned beneath the magnetic circuit.

3. An induction cooking heater according to claim 2, wherein the plate is made of aluminium.

4. An induction cooking heater according to claim 3, further comprising an inductor support comprising slots, and wherein the magnetic circuit is formed by a plurality of ferrite bars positioned in the slots, the reluctance being calibrated by the total volume of ferrite used, and by the type of ferrites used.

5. An induction cooking heater according to claim 3, wherein the plate of non-magnetic material is connected to the supply mains by means of a high-frequency filter of the generator.

6. An induction cooking heater according to claim 2 further comprising an inductor support is made of a thermally transfer between the inductor and the plate.

7. An induction cooking heater according to claim 6, wherein the inductor is placed in a spiral printed on the upper face of said inductor support.

8. An induction cooking heater according to claim 6, wherein the plate of non-magnetic material is connected to the supply mains by means of a high-frequency filter of the generator.

9. An induction cooking heater according to claim 2, wherein the plate of non-magnetic material is connected to the supply mains by means of a high-frequency filter of the generator.

10. An induction cooking heater according to claim 2, further comprising an inductor support comprising slots, and wherein the magnetic circuit is formed by a plurality of ferrite bars positioned in the slots, the reluctance being calibrated by the total volume of ferrite used, and by the type of ferrites used.

11. An induction cooking heater according to claim 2, wherein the magnetic circuit is a disk of magnetic material acting as a support for the inductor.

12. An induction cooking heater according to claim 1, further comprising an inductor support comprising slots, and wherein the magnetic circuit is formed by a plurality of ferrite bars positioned in the slots, the reluctance being calibrated by the total volume of ferrite used, and by the type of ferrites used.

13. An induction cooking heater according to claim 12, wherein the inductor is made of a thermally conductive material so as to enable a calorific transfer between the inductor and the plate.

14. An induction cooking heater according to claim 12, wherein the plate of non-magnetic material is connected to the supply mains by means of a high-frequency filter of the generator.

15. An induction cooking heater according to claim 1, wherein the magnetic circuit is a disk of magnetic material acting as a support for the inductor.

* * * * *